United States Patent
Bohn et al.

(10) Patent No.: US 9,364,927 B2
(45) Date of Patent: Jun. 14, 2016

(54) DRILL BIT AND PRODUCTION METHOD

(75) Inventors: Klaus-Peter Bohn, Schaanwald (LI);
Stefan Grasberger, Feldkirch (AT);
Werner Kleine, Achim (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/467,220

(22) Filed: May 9, 2012

(65) Prior Publication Data

US 2012/0285749 A1    Nov. 15, 2012

(30) Foreign Application Priority Data

May 12, 2011   (DE) .......................... 10 2011 075 769

(51) Int. Cl.
*E21B 10/60* (2006.01)
*B23P 15/28* (2006.01)
*B23B 51/06* (2006.01)

(52) U.S. Cl.
CPC ............... *B23P 15/28* (2013.01); *B23B 51/06* (2013.01); *B23B 2226/75* (2013.01); *B23B 2251/406* (2013.01); *B23B 2251/68* (2013.01); *B23B 2270/62* (2013.01)

(58) Field of Classification Search
USPC ......... 175/393, 419, 421, 425, 307; 76/108.1, 76/108.2, 108.4, 108.6, 57; 408/229
See application file for complete search history.

(56) References Cited

U.S. PATENT DOCUMENTS

| | | | |
|---|---|---|---|
| 2,008,031 A | | 7/1935 | Miltner |
| 2,290,933 A | | 7/1942 | Adreasson |
| 2,290,934 A | | 7/1942 | Andreasson |
| 2,314,189 A | * | 3/1943 | Andreasson ................. 76/108.1 |
| 2,942,501 A | * | 6/1960 | Kallio .......................... 408/206 |
| 3,313,186 A | | 4/1967 | Rochon |
| 5,733,076 A | | 3/1998 | Basteck |
| 7,845,432 B2 | * | 12/2010 | Salins et al. .................. 175/215 |
| 2001/0006122 A1 | | 7/2001 | Kleine et al. .................. 175/213 |
| 2008/0072704 A1 | * | 3/2008 | Clark et al. ...................... 74/608 |
| 2009/0269152 A1 | | 10/2009 | Edwards et al. |
| 2010/0143055 A1 | | 6/2010 | Kleiner et al. |
| 2010/0272531 A1 | * | 10/2010 | Shavit ............................ 408/59 |

FOREIGN PATENT DOCUMENTS

| | | |
|---|---|---|
| CN | 200991782 | 12/2007 |
| CN | 101678485 | 3/2010 |
| CN | 201493517 | 6/2010 |
| DE | 524 519 | 5/1931 |
| GB | 2 290 995 | 1/1996 |
| GB | 1 120 732 | 7/1996 |

* cited by examiner

*Primary Examiner* — Taras P Bemko
(74) *Attorney, Agent, or Firm* — Davidson, Davidson & Kappel, LLC

(57) ABSTRACT

A drill bit 1 has a drill head 3 and a shank 4. The shank 4 has a body 20, an add-on part 40 and an internal channel 50. The drill head 3 is attached to the body 20. The add-on part 40 is attached to a lateral surface 21 of the body 20 and arranged completely within a cylindrical envelope 29 that circumscribes the body 20. The internal channel is configured within the add-on part and/or between the add-on part 40 and the lateral surface 21.

26 Claims, 4 Drawing Sheets

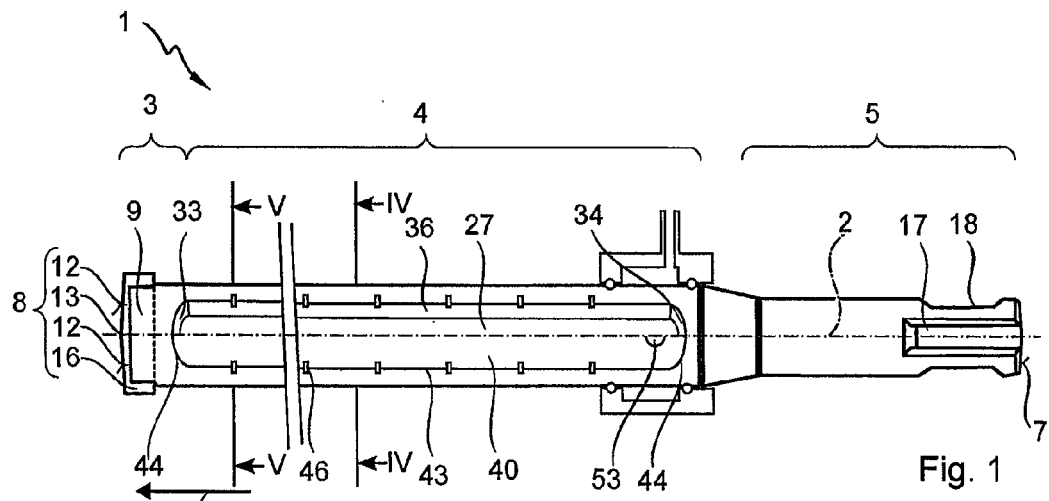
Fig. 1
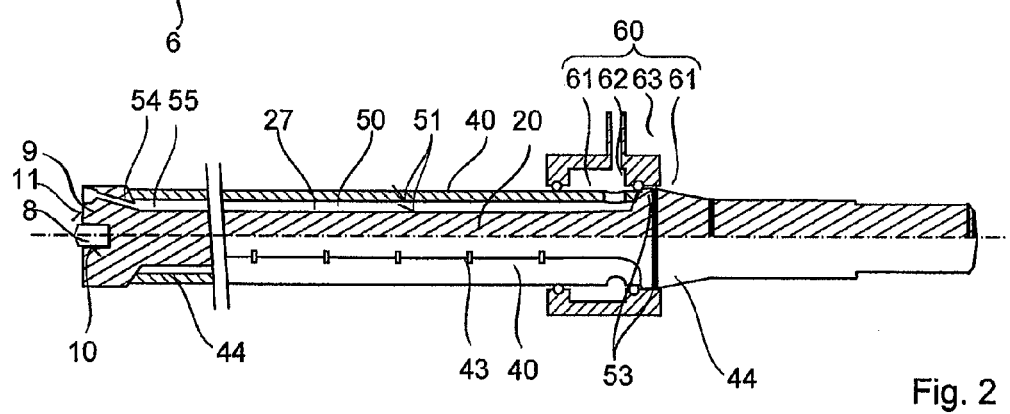
Fig. 2
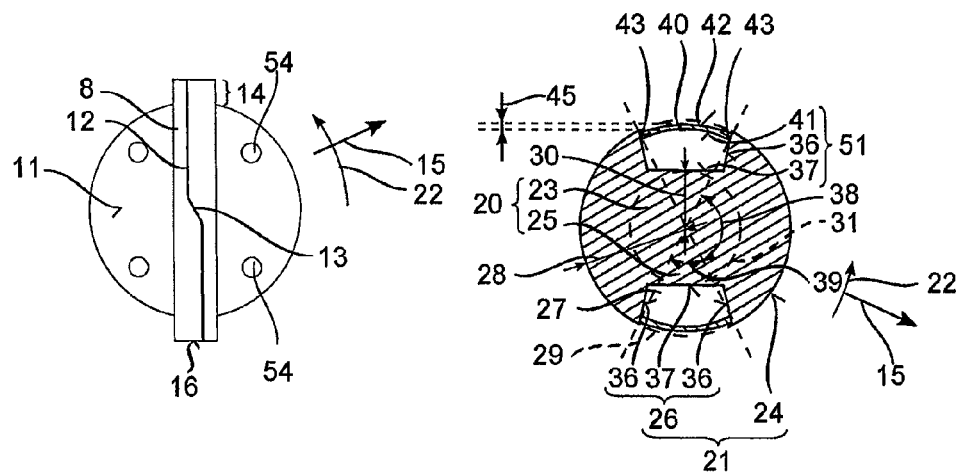
Fig. 3
Fig. 4

DRILL BIT AND PRODUCTION METHOD

This claims the benefit of German Patent Application DE 10 2011 075 769.4, filed May 12, 2011 and hereby incorporated by reference herein.

The present invention relates to a drill bit, especially to a drill bit for boring work in stone or mineral materials, particularly with a suction channel. Moreover, the invention relates to a production method for such a drill bit.

BACKGROUND

A boring chisel for performing work in stone, concrete, masonry and similar brittle materials is disclosed, for example, in U.S. Pat. Appln. No. 2001 006122. The boring chisel has a tubular shank with a coaxial through-channel. A suction sleeve is pulled over a crosswise drilled hole leading to the through-channel, and said suction sleeve is arranged in the vicinity of the insertion end. The drillings created by a drilling head can be removed by suction through the passage channel.

SUMMARY OF THE INVENTION

The drill bit according to the present invention constitutes a departure from the suction drill bit design commonly employed up until now. The drill bit according to the present invention has a drill head and a shank. The shank has a body, an add-on part and an internal channel. The drill head is attached to the body, preferably on a front surface of the body. The add-on part is attached to a lateral surface of the body and is arranged completely within a cylindrical envelope that circumscribes the body. The envelope describes the solid of revolution of the body. The internal channel is configured inside the add-on part and/or between the add-on part and the lateral surface.

The shank is configured in multiple parts. The body connects the drill head and serves essentially to transfer a torque and, if applicable, axial impacts from a power tool, to the drill head. The channel runs outside of the body. The add-on part, which is attached to a lateral surface, in other words, it is not at all or else only partially surrounded by the body, closes off the channel to the outside in the radial direction. The channel can be parallel to the axis and is nevertheless arranged offset with respect to the axis.

The drill bit has a shank with an internal channel, for example, along an axis between the drill head and an insertion end. The channel is surrounded by the body of the shank and by a cover that is in contact with a lateral surface of the body. The cover is arranged completely within a circumscribing, cylindrical envelope of the body.

One embodiment provides that the lateral surface of the body has at least one concave segment that extends along the axis in the circumferential direction, and the add-on part is in contact with the concave segment. In the area of the concave segment, a lateral surface of the body is set back with respect to the adjacent areas. The adjacent areas define the outer radius of the body, that is to say, the solid of revolution and the envelope. The add-on part in contact with the radially set-back section of the lateral surface lies completely within the envelope.

The channel can run continuously from a first opening to a second opening. The first opening is at an end of the shank that is adjacent to the drill head, while the second opening is at an end of the shank that is adjacent to an insertion end of the drill bit. The channel runs essentially over the entire length of the shank. The channel is preferably circumferentially closed over its entire length, similar to a tube. The add-on part can extend from the first opening to the second opening. The channel is thus closed over the entire length by the add-on part. The first opening can be situated in a face of the shank.

One embodiment provides that the add-on part has a plate-like cover that is in contact with two flanks of the concave segment that face each other and that are at a distance from each other in the circumferential direction. The cover is plate-like, that is to say, its wall thickness or its dimension in the radial direction is considerably smaller, for instance, less than 20%, than its dimensions in the circumferential direction or along the axis of the drill bit. The cover is preferably continuously in contact with the flanks along its dimension extending along the axis. In particular, the cover is in contact with the flanks along their entire extension. The channel is circumferentially closed, preferably continuously along its extension between the two openings. An air stream can only exit the channel at the openings at the ends of the shank. A surface of the cover facing an axis of the drill bit and the concave segment constitute inner surfaces of the channel. The cover is at a distance from the lateral surface between the two flanks in order to form the channel together with the lateral surface. The cover can be made of a material that differs from that of the body, in particular, the cover can be made of a plastic.

One embodiment provides that the add-on part contains a tubular hollow body. The tubular hollow body can be a stiff tube, a flexible hose, a flexible hose with stiffened ends, etc. A tubular hollow body shown by way of an example has an opening at its two ends. Circumferentially to a connecting line of the two ends, the hollow body is completely closed along the entire connecting line. One outer surface of the tubular hollow body is attached to the concave segment. The circumferentially closed inner surface forms the inner surface of the channel. One dimension of the tubular hollow body along an axis of the drill bit corresponds to a dimension of the concave segment along the axis. The tubular hollow body extends essentially over the entire length of the shank. The tubular hollow body can be made of a different material and can have a different structure from that of the body. In particular, the tubular hollow body can be made of a textile fabric, of natural or synthetic fibers, or of plastic injected into a mold.

One embodiment provides that the body is a solid body. In particular, the body does not have any hollow spaces running along its axis. A solid of revolution defined by the body that rotates around the axis defines an outer radius, while a cylindrical core that touches the lateral surface and that is inscribed in the body defines an inner radius of the body. The inner radius preferably amounts to between 25% and 75% of the outer radius. A tip of the drill head is supported on the solid core along the axis. During chiseling work, the tip is exposed to the greatest stresses in the axial direction, and the structure of the drill bit makes it possible to optimally transfer shock waves purely axially between the stressed tip and a power tool.

A production method for a drill bit can comprise the following steps. A flute is created in a cylindrical blank, whereby the flute is oriented along an axis of the blank. The flute can be created, for instance, by shaping the blank, especially by means of lengthwise rolling, flow molding or by tapering. The flute runs over at least half the length of the drill bit that is to be made out of the blank. An add-on part is placed onto the flute. A channel that runs along the flute is formed inside the add-on part and/or between the add-on part and the lateral surface. The add-on part is arranged completely within a cylindrical envelope that circumscribes the body. The flute is configured so as to be sufficiently deep, so that the add-on part that is subsequently installed does not project beyond the original volume of the blank. A cutting element is arranged on the face of the blank.

One embodiment provides that the blank is cut to the length of the drill bit to be produced after the flutes have been made. The blank can be, for example, a continuous wire into which the flutes and optionally also grooves that are closed along the axis and that cause concurrent rotation are produced by rolling. After the rolling, the continuous wire is cut to the length of the drill bit.

The add-on part can be made separately from the blank and subsequently joined to the blank. The add-on part is inserted into the flute. In this process, the add-on part is attached by joining the materials integrally and/or with a positive fit, for instance, with intermeshing projections or with an adhesive. As an alternative, the add-on part can be formed in the flute, for example, a sacrificial element can be placed onto the flute, after which the sacrificial element is encapsulated in order to form the add-on part, and subsequently the sacrificial element is removed in order to form the channel. The dimensions of the sacrificial element are complementary to those of the channel. The sacrificial element can be made, for example, of paraffin or of another material that can be washed out with a solvent.

BRIEF DESCRIPTION OF THE FIGURES

The description that follows explains the invention on the basis of figures and embodiments provided by way of examples. The figures show the following:

FIG. 1 a drill bit in a side view;
FIG. 2 the drill bit rotated by 90° with respect to FIG. 1, in a partially sectional view;
FIG. 3 a top view of a drill head of the drill bit;
FIG. 4 a cross section along the plane IV-IV through a shank of the drill bit.

DETAILED DESCRIPTION

Figure 5:
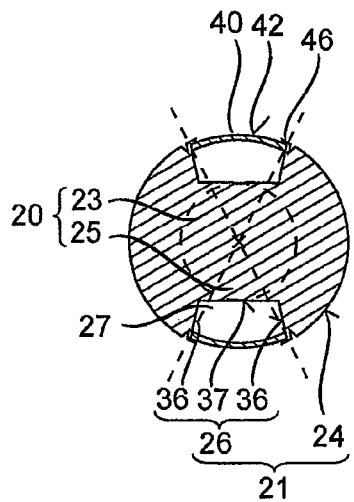
FIG. 5 a cross section along the plane V-V through the shank of the drill bit.

Unless otherwise indicated, the same or functionally equivalent elements are designated by the same reference numerals in the figures.

FIG. 1 shows a drill bit 1 for mineral materials, for example, natural stone or concrete, in a side view. FIG. 2 shows the drill bit 1 rotated by 90° around an axis 2 of the drill bit 1, whereby in the upper half of the drawing, the drill bit 1 is depicted in the plane II-II, in a partially sectional view. FIG. 3 shows a top view of a drill head 3 (See FIG. 1) of the drill bit 1. FIG. 4 shows a cross section oriented perpendicular to the axis 2 through a shank 4 of the drill bit 1. The drill head 3, the shaft 4 and an insertion end 5 of the drill bit 1 are arranged one behind the other along the axis 2. The drill bit 1 can be inserted with its insertion end 5 into a power tool. The power tool turns the drill bit 1 around the axis 2; in the meantime, the user or a mechanical drive moves the drill bit 1 along its axis 2 in the drilling direction 6. The drilling direction 6 serves to describe an orientation along the axis 2, whereby the phrase "in the drilling direction" designates a direction from the insertion end 5 to the drill head 3. The drill bit 1 shown is designed for drilling and chiseling power tools which, in addition to the rotational movement, also exert periodical impacts onto a face 7 of the insertion end 5 in the drilling direction 6.

The drill head 3 has a cutting element 8 that is incorporated in a seat 9. The cutting element 8 can be made of sintered hard metal. A suitable hard metal contains, for example, tungsten carbide. The seat 9 is preferably made of steel. The seat 9 can have a slit 10 in a face 11 facing in the drilling direction 6. The cutting element 8, which is, for example, plate-like, is inserted into the slit 10. The cutting element 8 has two (chiseling) edges 12 that face in the drilling direction 6 and that extend without interruption radially outwards from a tip 13 that is situated on the axis 2. The tip 13 preferably protrudes beyond radially outer areas of the edges 12 in the drilling direction 6. The edge 12 can be configured, for example, to be roof-shaped. Starting at the tip 13, the edges 12 drop monotonously towards their radially outer ends 14 opposite from the drilling direction 6. In an area near the tip 13, the slant of the edges 12 with respect to the axis 2 can be less pronounced than in a radially outer area. In the radially outer area, the edge 12 can be, for instance, almost perpendicular to the axis 2. The two edges 12 that form the tip 13 are also referred to as main blades. The radially outer ends 14 of the edges 12 protrude beyond the seat 9 in the radial direction 15. A scraping edge 16 that is essentially parallel to the axis 2 adjoins the chiseling edge 12 facing in the drilling direction. The scraping edge 16 projects radially beyond the seat 9. While the chiseling edges 12 chisel and shatter the stone, the scraping edge 16 ensures that the drilled hole has a circular cross section.

Instead of the drill head 3 as shown here, the drill head 3 can also have two crossed cutting elements. So-called secondary blades are oriented with respect to the main blades at an angle between 60° and 120°. The drill head can be made completely of hard metal. The drill head has a rear face that is approximately as large as a face of the shank 4. The drill head can be attached to the shank 4 by joining the materials integrally, for instance, by welding or soldering. Other drill heads can also have a different number of edges. The drill head can also have polished blades removing material by cutting it away.

The insertion end 5 shown is specially designed for a rotating drill bit 1 used for chiseling work. The essentially cylindrical section at the end of the drill bit 1 has a diameter that matches the fixed inner diameter of a tool socket of commercially available power tools. The tool sockets can have webs or studs for better torque transmission, which engage with matching grooves 17 for purposes of causing the insertion end 5 to rotate concurrently. The axially open grooves 17 are open opposite from the drilling direction 6 in that they extend all the way to the face 7 of the drill bit. The drill bit 1 can be locked in place in the tool socket by means of additional grooves 18 that are axially closed along the axis 2 in order to lock the insertion end 5. Other drill bits 1 can have a purely cylindrical insertion end without grooves or an insertion end with protruding wings instead of the grooves that serve to cause concurrent rotation.

The drill bit 3 and the insertion end 5 are rigidly joined via the shank 4. The shank 4 transmits a torque from the insertion end 5 to the drill head 3, if applicable, also an axial pulse from the insertion end 5 to the drill head 3. The drill head 3 can be inserted into a drilled hole over the length (dimension along the axis 2) of the shank 4. Advantageously, the shank 4 is several times longer than the drill head 3.

The shank 4 has a supporting body 20 that is connected to the drill head 3 and to the insertion end 5. In the example shown, the seat 9 of the drill head 3, the body 20 of the shank 4 and the insertion end 5 form a monolithic rod, that is to say, a contiguous rod without joining zones. The rod can be produced from a blank by means of shaping, for example, rolling, embossing or compressing. As an alternative, the drill head 3 and/or the insertion end 5 can be attached to the body 20.

The body 20 is a rod having an essentially uniform profile along the axis 2, that is to say, having a uniform shape in a section perpendicular to the axis 2. Faces of the body 20 are oriented lengthwise perpendicular to the axis 2. A closed and continuous lateral surface 21 surrounds the body 20 in the circumferential direction 22 relative to the axis 2. A volume closed off by the lateral surface 21 and the front surfaces is filled with a material, for instance, steel, when the body 20 is configured as a solid body. The body 20 has no hollow space; in particular, it is not a tube.

The body 20 shown has two convex sectors 23 which are spanned by the axis 2 and by a convex segment 24 of the lateral surface 21 of the body 20. The convex segment 24 of the lateral surface 21 can be formed by curved, for example, cylindrical surfaces, or else flat surfaces. In each case, a concave sector 25, spanned by the axis 2 and by a convex segment 24 of the lateral surface 21, is arranged in the circumferential direction 22 between the convex sectors 23. The body 20 can be produced, for instance, by creating flutes 27 in a solid, cylindrical blank. The number of flutes 27 or concave sectors 25 can be selected at will between one and six, preferably an even number. The body 20 is preferably structured so as to be rotationally symmetrical; the convex sectors 23 are configured to be identical to each other and the concave sectors 25 are configured to be identical to each other.

An outer radius 28 of the body 20 is defined by the radial distance of the convex segments 24 from the axis 2. A cylindrical envelope 29 which circumscribes the body 20 and which results from the rotation of the body 20 around the axis 2 has a radius that is equal to the outer radius 28. An inner radius 30 is the smallest radial distance of the concave segments 26 from the axis 2. Therefore, the body 20 has a cylindrical core 31 which is completely inscribed in the body 20 and which has the inner radius 30 that is concentric to the axis 2. The ratio of the inner radius 30 to the outer radius 28 falls in the range between 25% and 75%.

The concave sectors 25 or the complementary flutes 27 extend essentially over the entire length 32 of the body 20 or of the shank 4. Along the axis 2, the flutes 27 each have a front end 33 in the drilling direction 6, preferably, in the vicinity of the drilling head 3, and a rear end 34 opposite from the drilling direction 6, preferably in the vicinity of the insertion end 5. The flutes 27 connect each front end 33 to the associated rear end 34 without interruption. A length 35 of the flutes 27, that is to say, the distance from the front end 33 to the rear end 34 as measured along the axis 2, preferably amounts to at least 90% of the length 32 of the body 20 or of the shank 4.

The concave segment 26 shown has the complementary shape of a trapeze. The concave segment 26 has two flanks 36 facing each other. The flanks 36 run at least partially in the radial direction, for instance, they enclose an angle of 0° to 60°, for example, up to 45°, up to 30°, with the radial direction. The two flanks 36 delimit a hollow space that lies between them. The flanks 36, which are provided by way of an example, run, for instance, parallel to the axis 2. A bottom 37 of the segment 26, which connects the two flanks 36 to each other, can be configured to be concave, planar or partially convex. The transitions between the flanks 36 and the bottom 37 can be rounded off; conceivable modifications of the concave segment 26 are, for example, the complementary shapes of a segment of a circle, of an ellipsis or of an oval.

Part of the convex segments 24 on a circumference of the body 20 is greater than 25%, for instance, greater than 50%, and smaller than 75%. The circumference can be related to the envelope 29. The sum of the mid-point angles 38 of the two cylindrical sectors 23 is in the range between 90° and 270°. The size of the mid-point angle 38 is related to the extension of the convex segment 24 of the lateral surface 21. The mid-point angles 39 of the concave sectors 25 add up to the remaining part of 360°.

A cover 40 is placed onto each of the concave sectors 25. The cover 40 shown by way of an example is a long, thin bowl. The cover 40 has a surface 41 facing the axis 2, a surface 42 facing away from the axis 2, two lengthwise edges 43 that close off the cover 40 in the circumferential direction 22 as well as two faces 44 that close off the cover 40 along the axis 2. One length of the cover 40, that is to say, a distance between the faces 44 or a dimension of the lengthwise edges 43 along the axis 2, is about equal to the length 35 of the concave segment 26 or of the flute 27. The faces 44 of the cover 40 overlap with the ends 33, 34 of the flute 27, or else they cover these ends 33, 34 completely. The surfaces 41, 42 are, for example, curved; they are convexly curved with respect to the axis 2. In one embodiment, one or both surfaces 41, 42 can be configured so as to be planar. The cover 40 can be made, for instance, of a plastic or of a metal strip.

The cover 40 is arranged within the envelope 29, in other words, the solid of revolution of the body 20. In the case of the cover 40 shown by way of an example in FIG. 3, the entire surface 42 that faces outward is at a distance from the envelope 29. In one embodiment, for example, the lengthwise edge 43 touches the envelope 29 from the inside. The thickness 45 of the cover 40, that is to say, the distance between the opposite surfaces 41, 42, is considerably smaller, for example, 20%, than the difference between the outer radius 28 and the inner radius 30 of the body 20.

Each of the two, preferably parallel, lengthwise edges 43 touches the lateral surface 21 of the concave segment 26 continuously along a line of contact. The contact line is preferably as long as the lengthwise edges 43. In the embodiment shown, the faces 44 touch the lateral surface 21, as a result of which the contact lines are closed to form a ring-shaped line.

The cover 40 can be attached with a positive fit to the concave segment 26. Along the axis 2, several tabs 46 projecting in the circumferential direction 22 are provided on the flanks 36, and these tabs 46 are in contact with the surface 42 of the cover 40 facing away from the axis 2 (see FIG. 5). The tabs 46 can be made, for example, by locally notching the body 20 in the boundary areas of the convex segments 24 and the concave segments 26 once the cover 40 has been placed onto the concave segment 26.

The surface 41 facing the axis 2 is at a distance from the lateral surface 21. In particular, a section of the surface 41 that continuously connects the two faces 44, for example, a strip-like section, is at a distance from the lateral surface 21. Therefore, the body 20 and the cover 40 surround a channel 50 that extends along the axis 2. The tubular or closed channel 50 has a circumferentially closed inner wall 51 along its entire length. The inner wall 51 is formed, for instance, by the flanks 36, the bottom 37 and the cover 40, especially by its surface 41 facing the axis 2.

The channel 50 shown by way of an example has precisely one suction opening 53 and one exhaust opening 54, and said channel 50 connects them to each other. The suction opening 53 is configured, for instance, as a radial opening in the cover 40. The suction opening 53 is preferably arranged in the vicinity of the insertion end 5; the distance from the suction opening 53 to the end of the flute 27 that is at the insertion end is, for example, less than 10% of the length of the flute 27. The exhaust opening 54 shown is configured on the face 11 of the drill head 3. A drilled hole 55 through the drill head 3, for instance, through the seat 9, connects the exhaust opening 54 to the flute 27. The drilled hole 55 can be slanted relative to the axis 2. The channel 50 can also exit to the outside radially in a boundary area between the drill head 3 and the shank 4 and can form the exhaust opening 54 there.

A cuff 60 can be pulled over the shank 4 in the area of the suction opening 53. The cuff 60 has, for example, two annular sealing elements 61, for instance, O-rings, that are axially offset with respect to each other. The sealing elements 61 can be flush with the shank 4. The cuff 60 is positioned in such a manner that the suction opening 53 is arranged along the axis 4 between the sealing elements 62. A hollow space 63 configured annularly around the suction opening 53 can be connected via a connecting piece 64 to a pump or to another air-conveying means.

Figure 6:
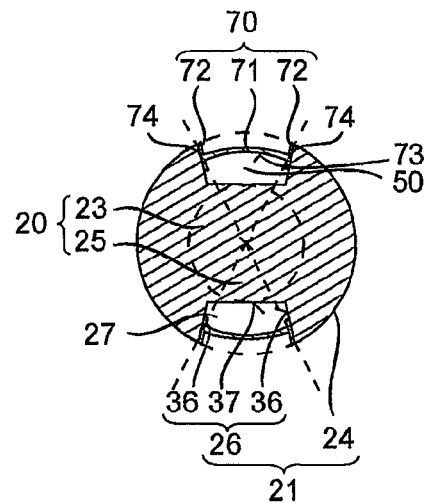
FIG. 6 a cross section through a shank of a drill bit.

FIG. 6 shows a cross section through a shank 4 of another embodiment of a drill bit 1 provided by way of an example. A repetition of the description of the features matching this and the preceding embodiments will be dispensed with here. Insofar as the description below does not indicate any differences, it should be assumed that the structure of the features that are not described is analogous, especially when reference numerals have been selected that match the preceding embodiments.

An elongated cover 70 rests on the concave segment 26 of the body 20. The cover 70 presented by way of an example has a profile with a web 71 and two crosspieces 72. The web 71 arranged between the two crosspieces 72 can be configured identically to the cover 40 of the preceding embodiment. In particular, the web 71 covers the concave segment 26 along its entire length 35 or at least over 90% of its length 35. The web 71 is preferably thin and can be curved so as to be bowl-shaped. The closed channel 50 is circumferentially closed by the surface 73 of the web 71 facing the axis 2 and by the concave segment 26.

The crosspieces 72, also referred to as flanges, adjoin the lengthwise edges 74 of the web 71. The crosspieces 72 are angled with respect to the web 71, for example, within the range between 70° and 20°. The crosspieces 72 shown protrude beyond the web 71 in the radial direction, both in the direction facing away from the axis 2 as well as in the direction facing the axis 2, thus resulting in a double-T-shaped profile. In one embodiment, the crosspieces 72 can, as an alternative, project over the web 71, either in the direction of the axis 2 or away from the axis 2.

The crosspieces 72 can extend along the entire length of the web 71 and of the cover 70. One alternative embodiment provides for several strap-like crosspieces 72 that are shorter than the web 71 and that are arranged one after the other along the web 71. Gaps can be present between the strap-like crosspieces 72, or else they can be directly adjacent to each other.

The crosspieces 72 are in contact, preferably flush over the entire surface, with the flanks 36 of the concave segment 26. The large contact surface of the crosspieces 72 increases the holding force of the cover 70 on the lateral surface 21 as a result of the integral joining of the materials and/or positive fit. Moreover, a better sealing of the channel 50 along the seam line between the cover 70 and the body 20 can be expected.

The web 71 is preferably made of a stiff material, preferably a plastic or metal. The crosspieces 72 can be made of an elastic material, e.g. rubber. The cover 70 can be attached to the concave segment 26 by means of a press fit. Moreover, the cover 70 can be glued in, or else can be held with a positive fit by tabs 46 or by other means.

The entire cover 70, including the crosspieces 72 that are partially oriented radially, is arranged within the cylindrical envelope 29 of the body 20. The cover 70 does not protrude beyond the solid of revolution defined by the body 20 that rotates around the axis 2.

Figure 7:
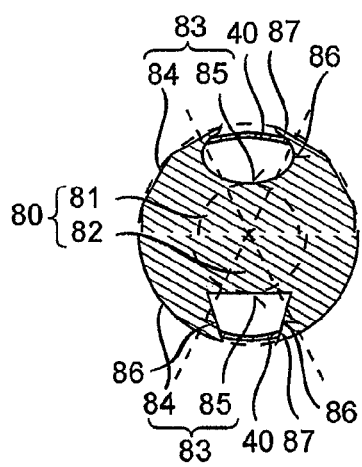
FIG. 7 a cross section through a shank of a drill bit.

The top half of the drawing in FIG. 7 shows a half cross section through a shank 4 of another embodiment of a drill bit 1 provided by way of an example, and the lower half of the drawing shows a half cross section of an alternative shank 4. A repetition of the description of the features matching this and the preceding embodiments will be dispensed with here. Insofar as the description below does not indicate any differences, it should be assumed that the structure of the features that are not described is analogous, especially when reference numerals have been selected that match the preceding embodiments.

A body 80 has two convex sectors 81 and a concave sector 82 between each of the convex sectors 81. The lateral surface 83 of the body 80 correspondingly has convex segments 84 and concave segments 85 that alternate along the circumference. The convex segments 84 can be formed by cylindrically curved surfaces, or else by a planar surface. The dimensions of the sectors 81, 82 or of the appertaining segments 84, 85 can be selected to correspond to the previously described embodiments.

The concave segment 85 has two flanks 86 that face each other and that are adjacent to the convex segments 84. As shown, the flanks 86 can be formed by planar surfaces or else by curved surfaces. An angle of the flanks 86 relative to the radial direction is less than 60°, preferably less than 45°, for instance, less than 30°. The convex segment 84 has overhanging sections 87 in the circumferential direction 22. The overhanging sections 87 of the opposing flanks 86 approach each other in a direction from the axis 2 running radially to the outside along the circumferential direction 22. The concave segment 85 circumscribes a radially open hollow space circumferentially by more than 180°.

A cover 40 is inserted into the concave segment 85 and it touches the flanks 86 that face each other. The concave segment 85 and the cover form a channel 50 that extends along the axis 2.

Figure 8:
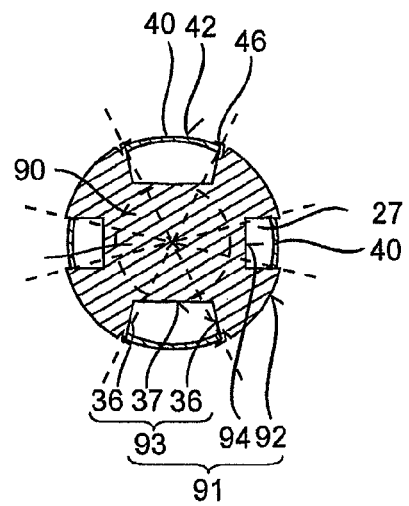
FIG. 8 a cross section through a shank of a drill bit.

FIG. 8 shows a cross section through a shank 4 of another embodiment of a drill bit 1 shown by way of an example. A repetition of the description of the features matching this and the preceding embodiments will be dispensed with here. Insofar as the description below does not indicate any differences, it should be assumed that the structure of the features that are not described is analogous, especially when reference numerals have been selected that match the preceding embodiments. A body 90 of the shank 4 has four flutes 27 along the axis 2. The flutes 27 divide a lateral surface 91 of the body 90 in the circumferential direction 22 into four convex segments 92 and into four concave segments 93, 94. Covers 40 close the flutes 27 in the radial direction 15. The concave segments 93, 94 can be of different widths, that is to say, their dimensions in the circumferential direction 22. The channel formed by the narrower segments 94 can be used, for instance, to feed in air, and the channels formed by the wider segments 93 can be used to remove air by means of suction. Instead of air, it is also possible to use other fluids such as, for example, water for flushing. In one embodiment, some of the flutes 27 are not covered. In this case, air can flow into the drilled hole along the uncovered flutes, and the drilling dust can be removed by means of suction through the flutes that are covered to form channels.

Another embodiment has a helical body. Convex sectors and concave sectors are configured as in the previous embodiments. Only the arrangement of the concave segments rotates around in the circumferential direction along the axis. An elongated cover is configured so as to be helical. The cover rests on the concave segment and thus closes off a helical channel with it. The cover is arranged completely within the envelope defined by the solid of revolution of the body.

A production method for a drill bit 1 shown by way of an example starts with a cylindrical blank made of steel. The blank has approximately the length of the later drill bit 1. In the area of the later shank 4, continuous flutes 27 are created in the blank along the axis 2, for example, parallel to the axis 2. The flutes 27 preferably extend over the entire length of the later shank 4. The width of the flutes 27, that is to say, their dimension in the circumferential direction 22, is in the range between 10% and 25% of the circumference, in other words, a mid-point angle is in the range between 30° and 90°.

Closed and open grooves 17, 18 can be made in an end area for the insertion end 5. Preferably, the flutes, and if applicable the grooves, can be made by means of a shaping method, for example, rolling. In particular, the flutes 27 can be made by a rolling process along the axis 2 of the blank. Preferably, the flutes 27 are created by calander rollers. As an alternative, the blank can be a continuous wire. The flute 27, and if applicable the grooves 17, 18, can be made in the blank, for instance, by means of a longitudinal rolling process. The rolled sections are continuously cut off from the continuous blank, in other words, blanks are produced that have been cut to size and provided with flutes 27 and grooves 17, 18.

A drilled hole leading to the flute 27 can be drilled through the face of the blank along the axis 2. The drilled hole can run slanted with respect to the axis 2. The drill head 3 is attached to the face 11. A depression 10 can be created in the face 11, and said depression 10 holds a cutting element 8 with a positive fit. The material is joined integrally, for example, by means of soldering or welding, in order to connect the cutting element 8 to the blank.

Plate-like or flat covers 50 are inserted into the flutes 27. The entire cover 40 is somewhat set back with respect to a cylindrical envelope of the blank. A punch can be employed to emboss notches along the edge of the flutes 27, in order to push some material over the cover 40 in the circumferential direction 22. The tabs 46 that are created in this process clamp the cover 40 in place. As an alternative or in addition, the cover 40 can be glued on.

Instead of putting the covers in place, they can also be injection-molded. First of all, a sacrificial element made of paraffin is placed onto the bottom 37 of the flutes 27. The sacrificial element only fills the flute 27 partially. A radial dimension of the sacrificial element is selected so as to be, for instance, between 25% and 50% of the depth of the flute 27. The dimensions of the sacrificial element are essentially complementary to the channel that is to be created. In particular, parts of the flanks 46 are not covered by the sacrificial element. A plastic for the cover 40 is injected into the flute 27 and onto the sacrificial element. The cover 40 adheres to the uncovered sections of the flanks 46. The channel 50 is exposed by removing the sacrificial element, for instance, with acetone. The sacrificial material is selected with respect to the plastic in such a way that a solvent that acts selectively can wash out the sacrificial element.

Figure 9:
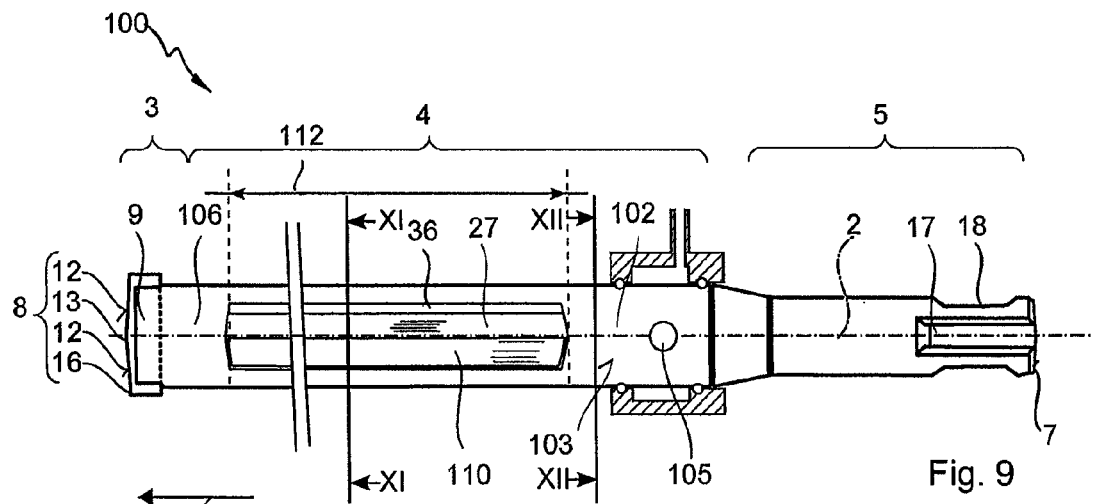
FIG. 9 a drill bit in a side view.
Figure 10:
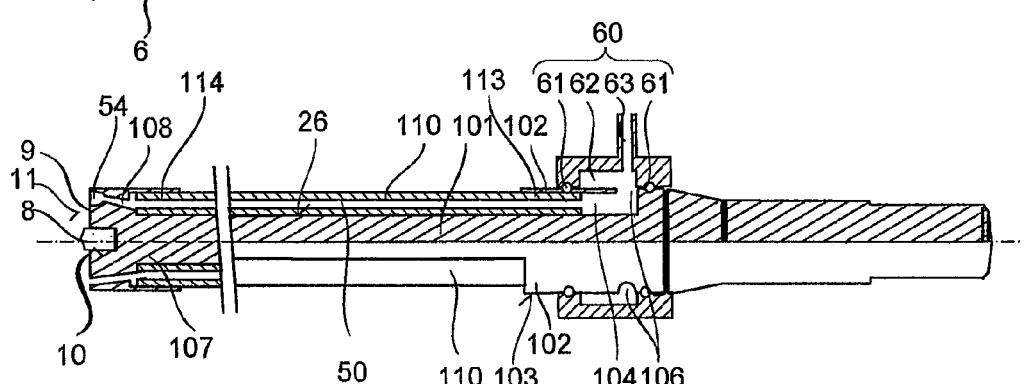
FIG. 10 the drill bit rotated by 90° with respect to FIG. 9, in a partially sectional view.
Figure 11:
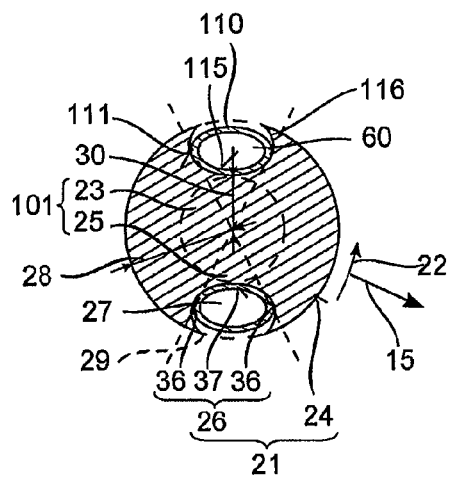
FIG. 11 a cross section along the plane XI-XI through a shank of the drill bit.
Figure 12:
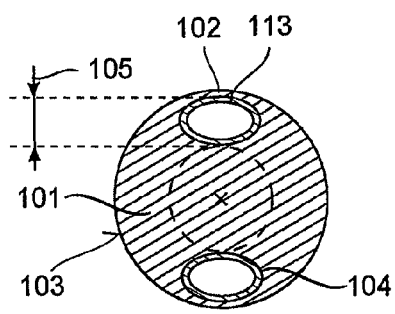
FIG. 12 a cross section along the plane XII-XII through the drill bit.

FIG. 9 shows another embodiment of a drill bit 100 in a side view; FIG. 10 shows the drill bit 100, in a partially sectional view, rotated by 90° relative to the view of FIG. 9. FIG. 11 is a cross section in the plane XI-XI and FIG. 12 is a cross section in the plane XII-XII.

The embodiment of the drill bit 100 has a plurality of features that coincide with those of embodiments of the drill bit 1, to which reference is made by using the same reference numerals. The drill bit 100 has a drill head 3, a shank 4 and an insertion end 5; reference is hereby made to the above-mentioned embodiments for a description of the drill head 3 and of the insertion end 5.

The shank 4 has a rod-like body 101 with convex sectors 23 and concave sectors 25. A lateral surface 21 of the body 101 has corresponding convex segments 24 between which concave segments 26 are arranged in the circumferential direction 22. The concave segments 26 can have a curved, e.g. cylindrical surface, or else planar surfaces.

A rear end piece 102 on the face closes off the body 101 along the axis 2 opposite from the drilling direction 6. The lateral surface 103 of the end piece 102 is configured to be completely convex, preferably cylindrical. A length of the cylindrical end piece 102 is preferably less than 10% of the length of the shank 4. Drilled holes 104 are drilled into the end piece 102 in the axial extension of the concave segments 26. The drilled hole 104 forms a sleeve that is circumferentially closed. A dimension 105 of the drilled hole 104 along the radial direction 15 of the drill bit 1 is less than the difference between the outer radius 28 and the inner radius 30. A radial drilled hole 106 in the end piece 102 opens into the sleeve 104. A front end piece 107 on the face can close off the body 101 and especially the concave sectors 26 in the drilling direction 6. Axial or partially axial drilled holes 108 are provided in the extension of the concave segments 26.

The channel 50 of the shank 4 has a hose 110 that is arranged on the outside of the body 101. FIG. 9 shows one half of the hose 110 in the lower half of the drawing, while in the upper half of the drawing, the hose 110 has been removed. An outer surface 111 of the hose 110 is, for example, clamped in place on the concave segment 26 of the lateral surface 21. The hose 110 preferably extends over the entire length 112 of the concave segment 26. A rear end piece 113 of the hose 110 can be inserted into the axial drilled hole 104 of the end piece 102 of the body 101. A front end piece 114 of the hose 110 can be inserted into the drilled holes 108 in the vicinity of the drill head 3. The hose 110 preferably has precisely two openings, both of which are provided on the front end piece 114 and on the rear end piece 113. Along a connecting line of the two end pieces 113, 114, the hose 110 is completely closed off by an inner surface 115 circumferentially, that is to say, in the perpendicular direction along the connecting lines. The inner surfaces 115 of the hose 110 are, at the same time, wall surfaces of the channel 50.

The hose 110 is made, for example, of rubber, a woven textile or a rubber-coated, woven textile. The hose 110 can be attached in the end piece 102 of the body 101, for instance, by clamping it in the sleeve formed by the drilled hole 104. Moreover, the hose 110 can be glued onto the body 101. Furthermore, the hose 110 can be clamped in the concave segment 26 and can be secured in the radial direction, for example, by means of overhanging flanks 116 or by means of tabs that project in the circumferential direction 22.

The hose 110 lies within the cylindrical envelope 29 that is created when the body 101 is rotated around its axis 2. The dimension 105 of the hose 110 is selected to be correspondingly less than the difference between the outer radius 28 and the inner radius 30.

A production method for the drill bit 100 starts with a cylindrical blank. The blank has, for example, a diameter that corresponds to the later outer diameter 28. A length of the blank can correspond approximately to the length of the drill bit 100 that is to be produced. Flutes 27 are milled into a lateral surface 21 of the blank. The flutes 27 preferably run parallel to the axis 2 of the blank. The flutes 27 are closed in at least one direction along the axis 2 in which the insertion end 5 will follow. A hose 110 is inserted into the flutes 27. The hose 110 is preferably as long as the flutes 27. The flutes 27 and the hose 110 form a shank 4 of the drill bit 100.

Figure 13:
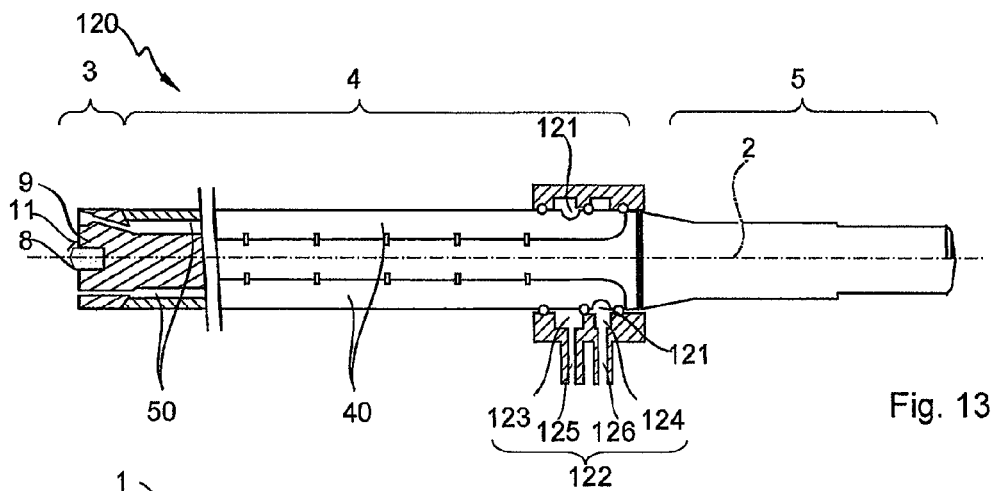
FIG. 13 a drill bit in a side view.

FIG. 13 shows another embodiment of the drill bit 120 with two separate channels 50. A repetition of the description of the features matching this and the preceding embodiments will be dispensed with here. Insofar as the description below does not indicate any differences, it should be assumed that the structure of the features that are not described is analogous, especially when reference numerals have been selected that match the preceding embodiments. The suction openings 121 of the two channels 50 are arranged offset along the axis 2. A cuff 122 for the drill bit 120 can be pulled over the shank 4 in the area of the suction opening 121. The cuff 122 has a first ring-shaped hollow space 123 that overlaps with one of the suction openings 121 along the axis 2, and a second ring-shaped hollow space 124 that overlaps with the other suction opening 121 along the axis 2. The two hollow spaces 123, 124 are separated from each other. Each of the hollow spaces 123, 124 can be connected via its own connecting pieces 125, 126 to an air-conveying means. For example, one of the channels 50 can blow air into a drilled hole while the drilling dust can be withdrawn through the other channel 50.

The embodiments presented here show a drill bit 1, 120, whose channels 50 are each formed by covers 40, or else a drill bit 100, whose channels 50 are formed by a hose 110. One embodiment provides that a channel 50 is formed by a cover 40 and that a channel 50 is formed by a hose 110. Regarding the embodiment described in conjunction with FIG. 8, especially the channel 50 formed by the hose 110 can be narrower. A hose 110 can be advantageous for driving air or another fluid through the shank 4 at high pressure. The drilling dust is withdrawn or pumped at a lower pressure gradient with respect to the environment, which is why it is sufficient to seal off the channel 50 by means of the cover 40 that has been placed there. Advantageously, the hollow cross section of the cover 40 is greater than that of the hose 110.

The drill bits 1 can have one or more channels 50. In the embodiments shown, the channels 50 are separated from each other, especially by the convex sectors 23, over the entire length of the shank 4. Another embodiment provides that the channels 50 converge at their end sections in the vicinity of the drill head 3 or in the vicinity of the insertion end 5. For instance, an annular groove in the body 20 can connect the channels 50.

Figure 14:
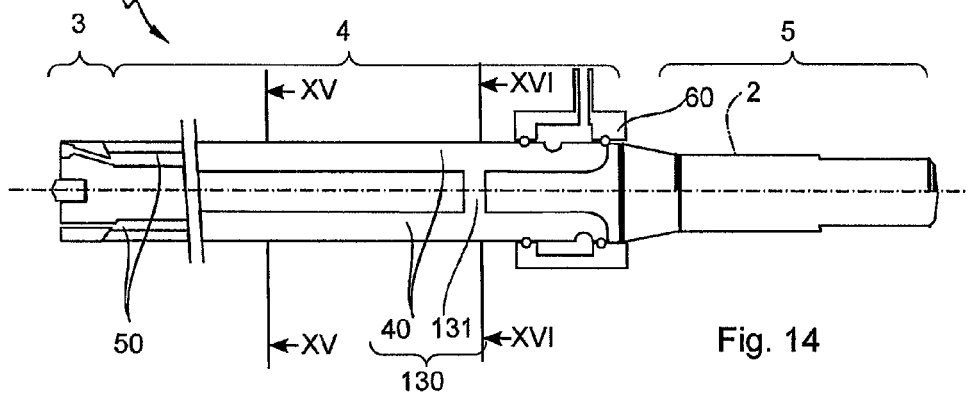
FIG. 14 a drill bit in a side view.
Figure 15:
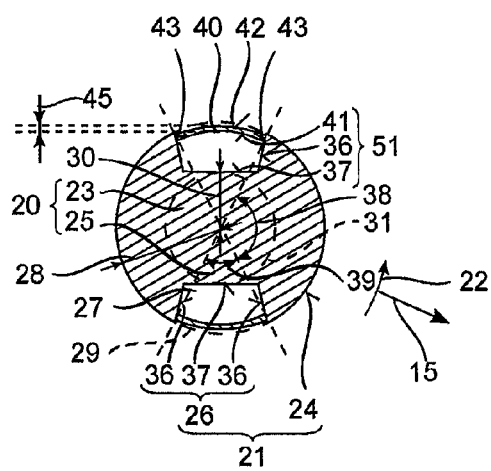
FIG. 15 a cross section along the plane XV-XV through a shank of the drill bit.
Figure 16:
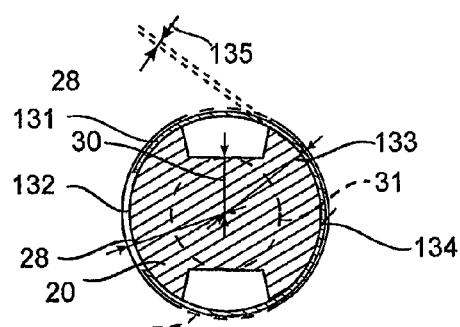
FIG. 16 a cross section along the plane XVI-XVI through the drill bit.

FIG. 14 shows another embodiment of the drill bit 1 in a side view, FIG. 15 shows a section through the shank 4 in the plane XV-XV, and FIG. 16 shows a section through the shank 4 in the plane XVI-XVI. A repetition of the description of the features matching this and the preceding embodiments will be dispensed with here. Insofar as the description below does not indicate any differences, it should be assumed that the structure of the features that are not described is analogous, especially when reference numerals have been selected that match the preceding embodiments. The lateral surface 21 of the body 20 has at least two concave segments 26 that are separated from each other, and two or more channels 50 are configured in the shank 4 correspondingly. A cover 130 closes the concave segments 26 with respect to the channels 50. The cover 130 has elongated plate-like bowls 40 that extend along the axis 2. The structure of these bowls 40 can match the covers 40 of the preceding embodiments. The bowls 40 rest on the concave segments 26 that extend along the axis 2. The bowls 40 are especially arranged completely within the cylindrical envelope 29 of the body 20.

A ring 131 of the cover 130 connects the bowls 40 to form a continuous body. The cover 130 can be monolithic, for example, the cover 130 is an injection-molded part. As an alternative, the ring 131 can be glued or welded onto the bowls 40. The ring 131 can be made of plastic, preferably of the same plastic as the bowls 40. The ring 131 can be closed completely circumferentially or else it can be slit, as shown.

A ring-shaped depression 132 is created in the body 20 around the axis 2. The dimensions of the depression 132 are complementary to the ring 131. In particular, the dimensions along the axis 2 are selected so as to be the same. An outer radius 133 of the ring 131 is preferably smaller than the outer radius 28 of the base 20. The ring 131 is therefore set back with respect to the envelope 29. A surface 134 of the ring 131 facing towards the inside is preferably in contact with the base 20. The thickness 135 of the ring 131 is, for instance, equal to or approximately equal to the thickness 45 of the bowls 40.

What is claimed is:

1. A drill bit with a drill head and a shank, comprising: a body, the drill head attached to the body; and an add-on part attached to a lateral surface of the body and arranged completely within a cylindrical envelope circumscribing the body, the cylindrical envelope having a radius equal to an outermost radius of the body, the lateral surface including a first flank and a second flank each extending radially to the outermost radius, the first flank and the second flank forming a flute with a width of 10 to 25% of the cylindrical envelope, the add-on part extending laterally between the first and second flanks, the add-on part forming an internal channel, for moving material in a direction away from the drill head, laterally between the first and second flanks configured within the add-on part and/or radially inside of the add-on part between the add-on part and the lateral surface.

2. The drill bit as recited in claim 1 wherein the internal channel runs from a first opening at an end of the shank adjacent to the drill head to a second opening on an end of the shank adjacent to an insertion end.

3. The drill bit as recited in claim 2 wherein the add-on part extends from the first opening to the second opening.

4. The drill bit as recited in claim 1 wherein the channel is straight and arranged parallel to an axis of the drill bit and is arranged offset with respect to the axis in the radial direction.

5. The drill bit as recited in claim 1 wherein the lateral surface of the body has at least one concave segment extending along an axis of the drill bit in the circumferential direction, and the add-on part is in contact with the concave segment.

6. The drill bit as recited in claim 5 wherein the concave segment includes the first and second flanks, the first and second flanks facing each other and at a distance from each other in the circumferential direction, the add-on part having a plate-like cover in contact with the first and second flanks.

7. The drill bit as recited in claim 6 wherein the cover is continuously in contact with the first and second flanks along an extension of the first and second flanks along the axis of the drill bit.

8. The drill bit as recited in claim 6 wherein a surface of the cover facing an axis of the drill bit and the concave segment are inner surfaces of the channel.

9. The drill bit as recited in claim 5 wherein the add-on part includes a tubular hollow body having an outer surface that is attached to the concave segment and a circumferentially closed inner surface forming an inner surface of the channel.

10. The drill bit as recited in claim 9 wherein one dimension of the tubular hollow body along the axis of the drill bit corresponds to a dimension of the concave segment along the axis.

11. The drill bit as recited in claim 9 wherein the hollow body is made of a fabric and/or of a plastic.

12. The drill bit as recited in claim 1 wherein the cover is made of plastic.

13. The drill bit as recited in claim 1 wherein the body is a solid body.

14. The drill bit as recited in claim 13 wherein a solid of revolution defined by the body rotating around an axis defines an outer radius, while a cylindrical core touches the lateral surface and is inscribed in the body to define an inner radius, the inner radius amounting to between 25% and 75% of the outer radius.

15. The drill bit as recited in claim 14 wherein the channel is straight.

16. The drill bit as recited in claim 1 wherein the drill head has an axis and two or more edges starting from a tip at the axis.

17. A production method for a drill bit, comprising the following steps:
    creating at least one flute in a cylindrical blank to define a body, the flute being oriented along an axis of the blank, the creating the at least one flute including forming first and second flanks of the body each extending radially to an outermost radius of the body, the flute being laterally between the first and second flanks, a width of the flute at the outermost radius of the body being in the range of 10% to 25% of the circumference of the body;
    placing an add-on part into the flute such that the add-on part extends laterally between the first and second flanks, the add-on part forming a channel, for moving material in a direction away from the drill head, running along the flute laterally between the first and second flanks inside the add-on part and/or radially inside of the add-on part between the add-on part and a lateral surface of the body, the add-on part being arranged completely within a cylindrical envelope circumscribing the body; and
    arranging a cutting element on a face of the blank.

18. The production method as recited in claim 17 wherein the flute is made in the blank by a non-cutting shaping process.

19. The production method as recited in claim 17 further comprising cutting the blank to the length of the drill bit to be produced after the flutes have been made.

20. The production method as recited in claim 17 wherein the add-on part is inserted into the flute and attached by joining materials integrally and/or with a positive fit.

21. The production method as recited in claim 17 further comprising placing a sacrificial element onto the flute, after which the sacrificial element is encapsulated in order to form the add-on part, and subsequently the sacrificial element is removed in order to form the channel.

22. A drill bit with a drill head and a shank, comprising:
    a body, the drill head attached to the body, the body having a circumference;
    a flute extending in the body, a width of the flute at the circumference being in the range of 10% to 25% of the circumference of the body; and
    an add-on part inserted into the flute and attached to a lateral surface of the body and arranged completely within a cylindrical envelope circumscribing the body, an internal channel, for moving material in a direction away from the drill head, being configured within the add-on part and/or between the add-on part and the lateral surface.

23. The drill bit as recited in claim 22 wherein the channel is straight and arranged parallel to an axis of the drill bit and is arranged offset with respect to the axis in the radial direction.

24. The drill bit as recited in claim 22 wherein a solid of revolution defined by the body rotating around an axis defines an outer radius, while a base of the flute defines an inner radius, the inner radius amounting to between 25% and 75% of the outer radius.

25. The drill bit as recited in claim 22 wherein the drill head has an axis and two or more edges starting from a tip at the axis.

26. The drill bit as recited in claim 22 further comprising a further flute, the flute and the further flute being arranged symmetrically on the lateral surface.

* * * * *